US010758829B2

(12) United States Patent
Cragg

(10) Patent No.: US 10,758,829 B2
(45) Date of Patent: Sep. 1, 2020

(54) MOBILE DC POWERED ENTERTAINMENT CENTER

(71) Applicant: Brandon Cragg, Lauderdale by the Sea, FL (US)

(72) Inventor: Brandon Cragg, Lauderdale by the Sea, FL (US)

(*) Notice: Subject to any disclaimer, the term of this patent is extended or adjusted under 35 U.S.C. 154(b) by 41 days.

(21) Appl. No.: 16/114,951

(22) Filed: Aug. 28, 2018

(65) Prior Publication Data

US 2019/0060768 A1 Feb. 28, 2019

Related U.S. Application Data

(60) Provisional application No. 62/551,009, filed on Aug. 28, 2017.

(51) Int. Cl.
*A63F 13/90* (2014.01)
*A63F 13/98* (2014.01)
*A45C 11/00* (2006.01)

(52) U.S. Cl.
CPC .............. *A63F 13/90* (2014.09); *A63F 13/98* (2014.09); *A45C 2011/003* (2013.01)

(58) Field of Classification Search
CPC ..... A63F 13/90; A63F 13/98; A45C 2011/003
See application file for complete search history.

(56) References Cited

U.S. PATENT DOCUMENTS

| 5,260,884 | A | * | 11/1993 | Stern | G06F 3/0202 361/679.1 |
| 2002/0023811 | A1 | * | 2/2002 | Silvano | A45C 3/02 190/11 |
| 2005/0170889 | A1 | * | 8/2005 | Lum | A63F 13/06 463/39 |
| 2008/0029153 | A1 | * | 2/2008 | Margalit | A45C 13/02 136/252 |
| 2011/0092294 | A1 | * | 4/2011 | Mercier | A63F 13/90 463/46 |

* cited by examiner

*Primary Examiner* — Jasson H Yoo
(74) *Attorney, Agent, or Firm* — Malloy & Malloy, P.L.

(57) ABSTRACT

A mobile entertainment center includes at least one TV monitor supported in a protective case on wheels. The case includes a removable cover that protectively conceals the TV monitor when not in use. When removed, the cover functions as a table or TV stand and includes removable or hinged legs. The TV monitor includes a non-reflective glass over the screen. The entertainment system is syncable with other portable electronic devices and includes speakers/sound bars. The entertainment center is DC powered and includes a voltage convertor. The mobile entertainment center further includes a charging station, flashlight, storage compartment, watertight casing, swipe screen technology, a control panel with access door, built in battery access, a rechargeable DC power source for each electronic device, a DC powered built-in gaming platform, and interactive karaoke technology.

7 Claims, 6 Drawing Sheets

MOBILE DC POWERED ENTERTAINMENT CENTER

This non-provisional patent application is based on provisional patent application Ser. No. 62/551,009 filed Aug. 28, 2017.

BACKGROUND OF THE INVENTION

Field of the Invention

The present invention relates to a mobile entertainment center and, more particularly, to an apparatus that includes at least one full size LCD flat screen television monitor, speakers, and an onboard rechargeable DC power source all carried in a protected case supported on wheels, and wherein the protective case converts into a tabletop for supporting the TV monitor and speakers.

Discussion of the Related Art

The operation of a full sized TV monitor, such as a LCD flat screen TV of 20 inches or larger in size, typically requires connection to an AC power source. Moreover, other components that may be used in conjunction with the TV monitor, such as a video game console, added speakers, and other electronic devices typically require connection to an AC power source as well. However, there are instances where it is desirous to be able to use a larger flat screen TV monitor at locations where there is no access to an AC power source. For example, beaches, parks, campgrounds and other outdoor venues typically do not have convenient access to an AC power source where a flat screen television monitor, speakers and other components can be plugged in for supplying power to operate the TV monitor and other components. Moreover, it can be difficult to transport a larger size flat screen TV monitor along with speakers and other electronic components to an outdoor venue, such as a beach or park.

Accordingly, there remains a need for a mobile DC powered entertainment center that includes at least one larger size (i.e., 20 inches or greater in size) flat screen TV monitor that is supported within a protective case on wheels, and wherein the entertainment center further includes one or more speakers, a rechargeable DC power source, as well as a built-in video gaming platform and other components, such as interactive karaoke technology.

There is a further need for a mobile DC powered entertainment center that includes a built-in DC power converter (i.e., converts 12 volts to 19 volts) and which is able to synchronize with a portable mobile device, such as a smart phone, as well as a drone (i.e., drone camera).

SUMMARY OF THE INVENTION

The present invention is directed to mobile entertainment center that includes at least one larger size LCD flat screen TV monitor supported in a protective case on wheels. The protective case includes a removable cover that protectively conceals the TV monitor when not in use. When removed, the cover functions as a table or TV stand and includes legs (i.e., either removable or hinged to the bottom of the cover). The TV monitor includes a non-reflective glass over the screen. The entertainment system is syncable with other portable electronic devices and includes speakers and sound bars. The mobile entertainment center is DC powered and includes a rechargeable DC power source, along with a voltage converter. The mobile entertainment center further includes a charging station, at least one flashlight, storage compartments, swipe screen technology, a control panel with access door, built-in battery access, a DC powered built-in gaming platform, and interactive karaoke technology. The following are features of the mobile DC powered entertainment center:

- Non Reflective Glass on the screen
- Solar and Wind Powered/Along with Stationary Bike Charger/Hand Crank Charger
- Convertor not Invertor
- Double Screens (screens that face both directions) Multiple Screens
- Wheels on Protective Carrying Case/doubles as TV Stand
- Handle On Television
- Syncable with other portable units
- Speakers/Sound Bars
- Socket in bottom of case for collapsible stand (like for speakers)
- Charging Station
- Flashlight
- Storage Compartment
- Water Tight Casing
- Each electronic device on the Mobile Entertainment Center will have its own rechargeable DC power source with the larger DC power source with more capacity being removable. (e.g.: speakers, television)
- DC Power built in gaming platform complete with joy sticks. (e.g. XBOX)
- Interactive Karaoke Technology (comparison would be to interactive trivia in a bar)
- Swipe Screen Technology on device
- Control panel access door. (so you can access volume button, on/off switch etc.)
- Built in battery access through side of case. (explanation: for changing batteries out of the device you simply push on battery and the battery pops out)
- Built in convertor (converts 12 volts into 19 volts or whatever volt the device requires)
- App will be written so remote control will control device through phone. Also be able to link to multiple devices on unit. As well as multiple other devices when present. (explanation: With present technology your phone can only control one device at a time)
- Device will be able to connect directly to drone. (explanation: whatever the drone camera sees will show up on screen of device)

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENT

Figure 1:
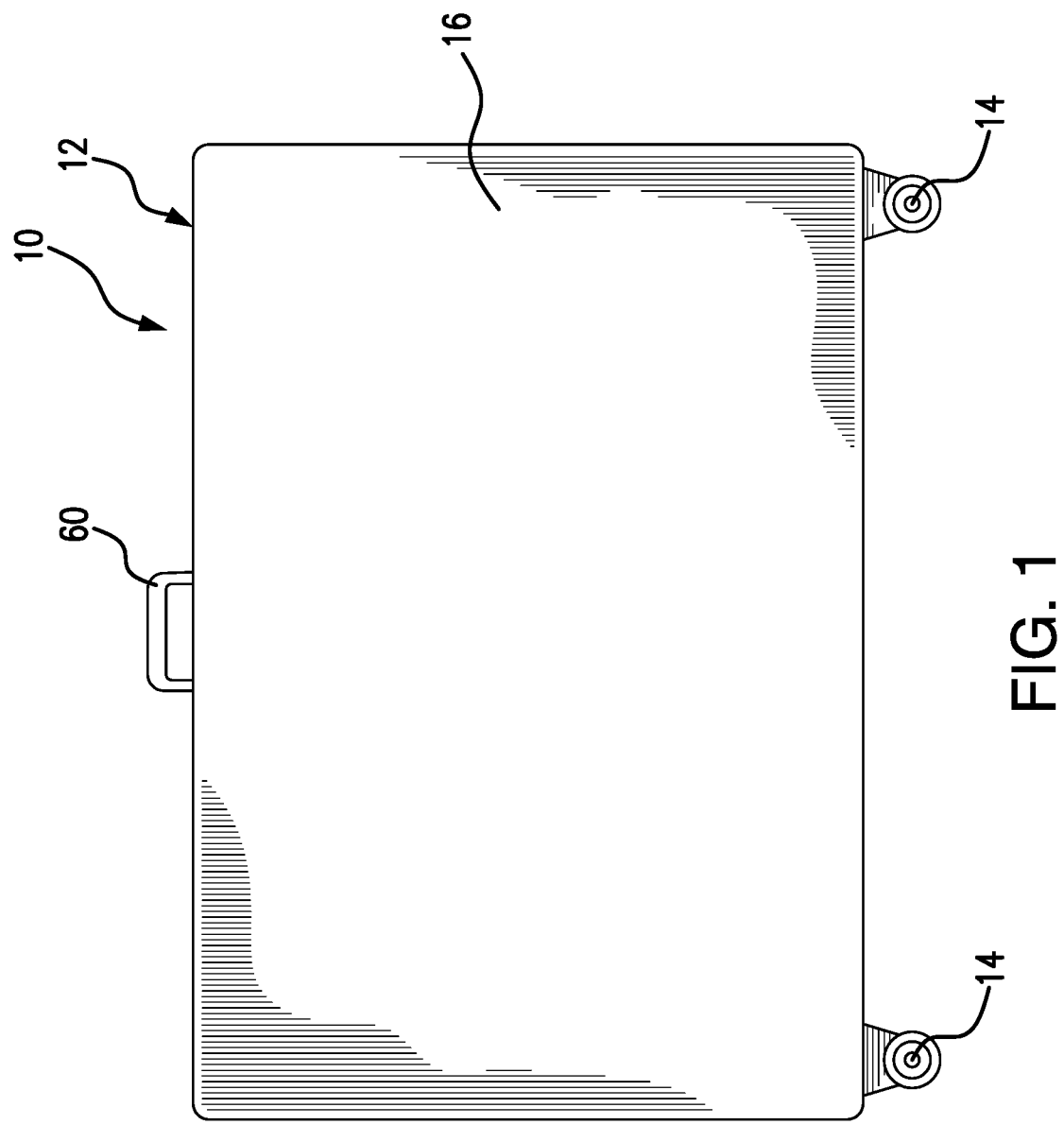
FIG. 1 is a front elevational view of the mobile DC powered entertainment center of the present invention, shown with a removable protective cover placed over a TV monitor for transport.
Figure 2:
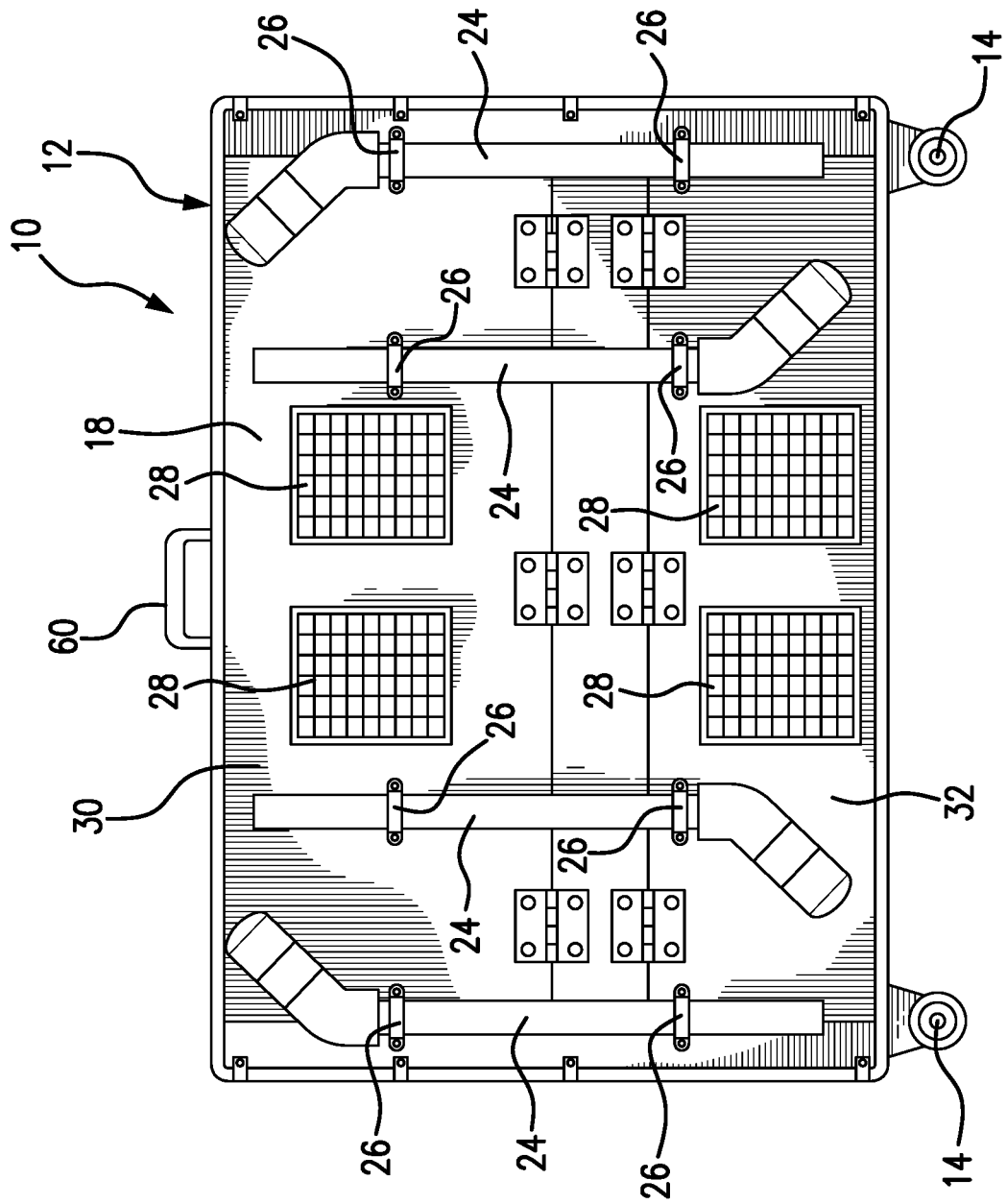
FIG. 2 is a rear elevational view of the mobile DC powered entertainment center shown ready for transport.
Figure 3:
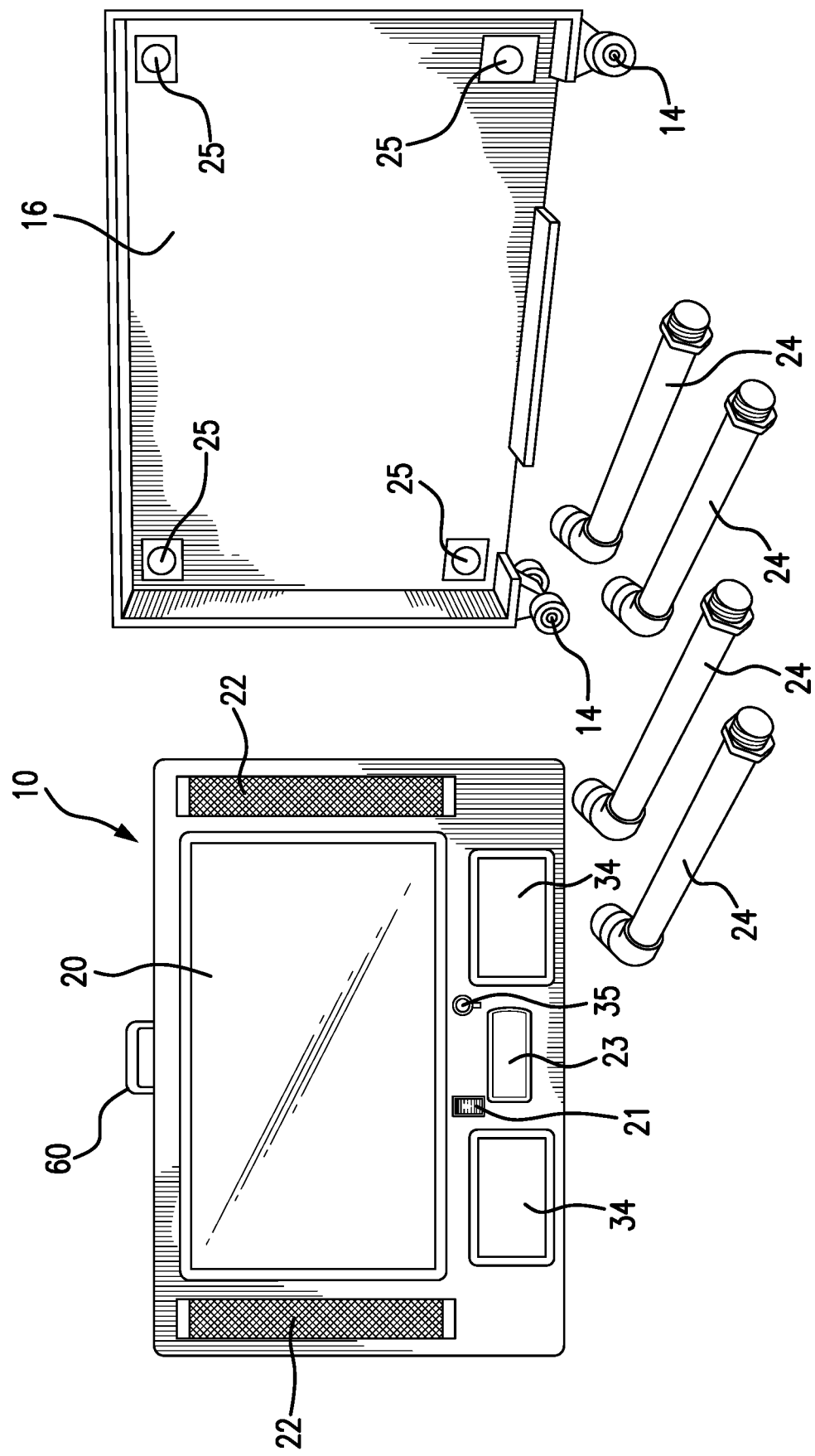
FIG. 3 is an exploded perspective view showing the protective cover of the case of the mobile entertainment center removed to reveal a large size LCD TV monitor, several smaller LCD flat screen displays and speakers on a front panel of the mobile entertainment center, as well as removable legs that attach to an underside of the protective cover to convert the protective cover into a table or TV stand for supporting the larger LCD flat screen TV monitor, speakers and other components.

Referring to the several views of the drawings, and initially FIGS. 1-3, the mobile DC powered entertainment center of the present invention is shown and is generally indicated as 10. The mobile entertainment center 10 includes a protective case 12 having a front panel and a rear panel 18. The protective case 12 is supported on two or more wheels 14 to allow ease of transport of the mobile entertainment center 10 along a floor or ground surface. The protective case 12 further includes a handle 60 to allow for ease of carrying of the mobile entertainment center 10, and particularly lifting of the mobile entertainment center 10 onto a table (see FIG. 4) or other elevated support surface. The protective case further includes a removable cover 16 that is attached to the remainder of the case to protectively cover the entire front panel, including a large LCD flat screen TV monitor 20 during transport of the mobile entertainment center. In a preferred embodiment, the wheels 14 are attached to the cover, as seen in FIG. 3. The cover 16 is removed from a remainder of the protective case 12 to reveal the TV monitor 12, as well as other components such as speakers/sound bars 22, smaller removable flat screen monitors 34, a removable DC charging station with flashlight 23, as well as an on and off switch 21 and a DC power socket 35.

Figure 4:
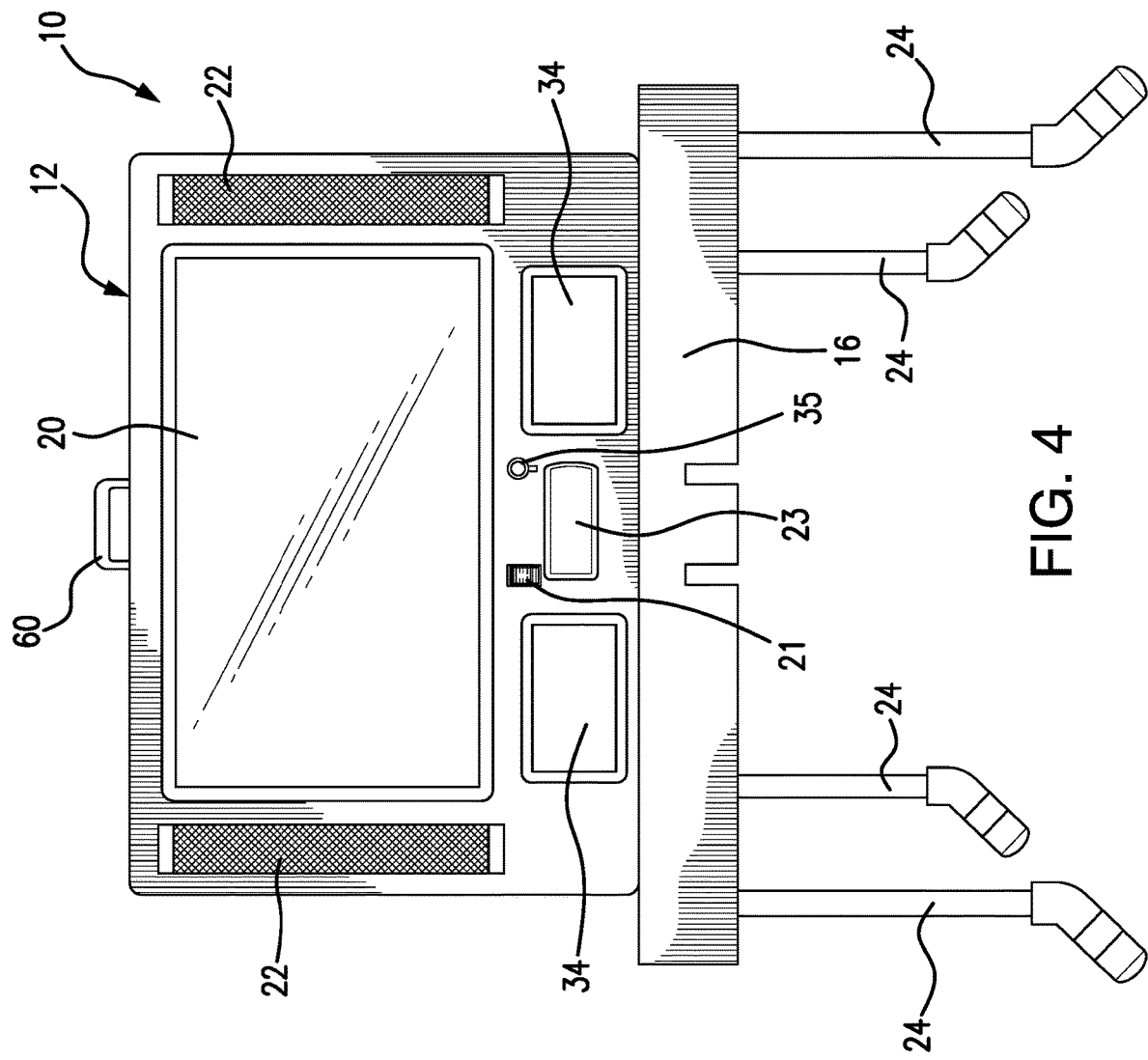
FIG. 4 is a front elevational view showing the entertainment center, including the larger LCD TV monitor, speakers, smaller LCD monitors and other components in the protective case of the entertainment center supported on the table or TV stand that is constructed using the cover of the protective entertainment center case with the legs attached to the underside of the cover.

The back panel 18 of the protective case is provided with an arrangement of clips 26 for holding legs 24 on the back panel during transport. When it is desired to set up the mobile entertainment center for use, at the desired location, the front cover 16 is removed and the legs 24 are removed from the back panel and attached within sockets 25 on an inner side of the protective cover 16 to create a table or TV stand, as seen in FIG. 4. The legs are provided with screw threads for screw threaded attachment within the sockets 25. Alternatively, the legs can be hingedly attached to the inside of the cover 16 and simply folded out and locked into place when it is desired to set up the table.

Figure 6:
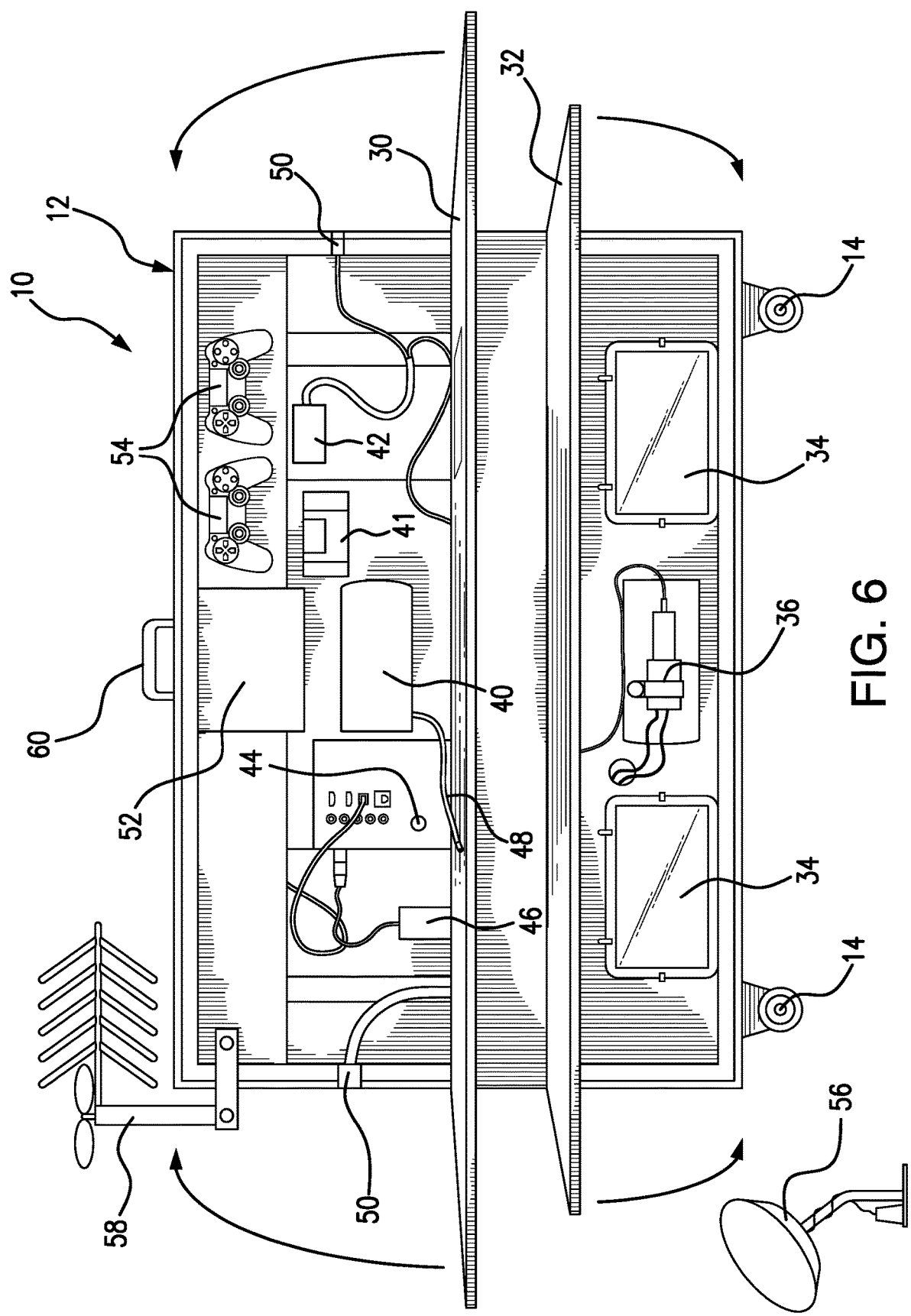
FIG. 6 is a rear perspective view showing upper and lower compartment doors on the backside of the entertainment center open to reveal the several components therein.

The back panel 18 further includes an arrangement of solar panels for recharging one or more DC battery power sources in the entertainment center. In a preferred embodiment, the solar panels have a 12 volt, 60 watt rating. The back panel 18 further includes an upper compartment door 30 that hinges open and down to reveal an upper compartment, and a lower compartment door 32 that hinges upwardly, to reveal a lower compartment, as illustrated in FIG. 6. The upper and lower compartments are within the protective case 12 and house a number of components, as described in more detail below.

Referring to FIG. 6, the lower compartment includes a 12 volt socket assembly 36 that connects to one or more 12 volt DC battery power sources containing the case 12. The 12 volt socket assembly 36 is further connected to the DC power socket 35 on the front panel of the protective case 12. The lower compartment may further house the removable and portable LCD flat screen monitors 34 that can be placed on the front panel, as seen in FIGS. 3 and 4, within or over compartments on the front panel. The compartments (not shown) are behind the removable portable flat screen monitors 34 in FIGS. 3 and 4 and can be used to hold various items such as headphones, remote controls, and personal belongings of the user.

The upper compartment, behind the upper compartment door 30, contains a rechargeable DC power supply 40 that is used to provide power to the several electronic components of the mobile entertainment center 10. The upper component further contains a charge controller 41, a step up power converter (12 to 19 volts) 42, a DC power input 44, a multiport USB hub 46 and connections 50 or auxiliary speakers. The rechargeable DC power supply 40 includes a DC power cord 48 for connection to a DC powered device.

A further feature of the mobile entertainment center 10 of the present invention is an onboard gaming platform for playing video games (e.g., XBOX, PLAYSTATION, NINTENDO). In particular, a DC powered video gaming console 52 is built within the protective vase 12, and is accessible through the upper compartment behind the upper compartment door 30, as seen in FIG. 6. The onboard video gaming platform further includes rechargeable wireless video game controllers 54 that are stowed within the upper component of the protective case 12, behind the upper compartment door 30 when not in use. Naturally, the video games are played by the user on the large flat screen LCD TV monitor 20 with audio provided through the several speakers/sound bars 22, as well as any added auxiliary speakers. The mobile entertainment center 10 may further include interactive karaoke technology.

A miniature satellite dish 56 may be provided for receiving satellite signals, in particular satellite TV and radio signals for connection to the TV monitor 12 and speakers 22. A collapsible hinged radio/TV antenna 58 can be contained within the upper compartment and deployed, as shown in FIG. 6, for receiving radio and TV signals. The antenna 58 may further be used for communicating with one or more drones, and particularly drones having still frame and video cameras, wherein images captured by the cameras on the drones can be displayed on the TV monitor 12, as well as the portable flat screen monitors 34.

Figure 5:
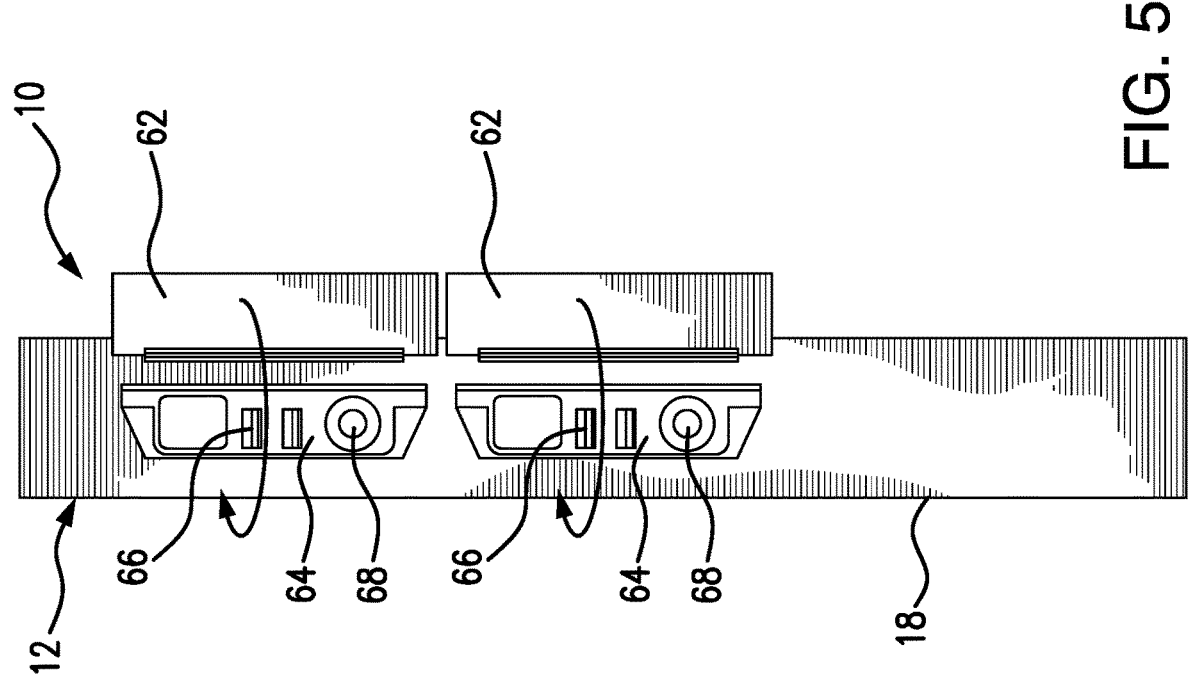
FIG. 5 is a side elevational view showing battery compartments on the side of the entertainment center, with built-in battery access that allow for changing of the batteries by simply pushing in on the battery to release a spring mechanism that pushes the battery out of the case of the entertainment center.

Referring to FIG. 5, a side of the protective case 12 includes hinged, watertight doors 62 that open to reveal rechargeable DC batteries (12 volt/19 volt) 64. The rechargeable DC batteries 64 include 5 volt USB recharging ports 66 as well as a flashlight recharging port 68. The rechargeable DC batteries can be easily removed from the protective case 12 of the mobile entertainment center 10 via a push/release spring loaded mechanism. By simply pushing in on the batteries, a spring release mechanism is activated which pushes the battery out from the side of the case for removal. This allows for ease of recharging and/or replacement of the batteries 64.

While the present invention has been shown and described in accordance with a preferred and practical embodiment, it is recognized that departures from the instant disclosure are fully contemplated within the spirit and scope of the present invention which is not to be limited except as defined in the following claims as interpreted under the Doctrine of Equivalents.

What is claimed is:

1. A mobile entertainment apparatus comprising:
    a protective case including a front panel, a rear panel, opposite sides, a top and a bottom, and a removable cover that protectively covers the front panel, and a plurality of wheels for transport of the protective case on a ground surface;
    at least one flat screen television (TV) monitor supported within the protective case and visibly exposed on the front panel;
    a plurality of speakers connected to the flat screen TV monitor and supported on the protective case;
    a rechargeable direct current (DC) power source contained within the protective case for powering the at least one flat screen TV monitor and speakers; and
    a plurality of support legs removably attachable to the removable cover for forming a table to support a portion of the protective case having the flat screen TV monitor and the plurality of speakers.

2. The mobile entertainment apparatus as recited in claim 1 wherein the protective case includes a built-in gaming platform including a video game console and at least one video game controller.

3. The mobile entertainment apparatus as recited in claim 2 wherein the at least one video game controller is a rechargeable wireless video game controller.

4. The mobile entertainment apparatus as recited in claim 1 further comprising a step up DC power converter within the protective case.

5. The mobile entertainment apparatus as recited in claim 4 further including at least one rechargeable DC battery.

6. The mobile entertainment apparatus as recited in claim 5 further comprising a plurality of portable LCD monitors removably attachable to the protective case.

7. The mobile entertainment apparatus as recited in claim 6 further comprising at least one solar panel on the protective case for recharging the at least one rechargeable DC battery by solar energy.

* * * * *